(12) United States Patent
De Sitter et al.

(10) Patent No.: US 8,557,022 B2
(45) Date of Patent: Oct. 15, 2013

(54) FILLED POLYMERIC MEMBRANES, USE AND METHOD OF MANUFACTURING

(75) Inventors: Kristien De Sitter, Deurne (BE); Steven Mullens, Zichem (BE); Lieven Gevers, Putte (BE)

(73) Assignee: Vlaamse Instelling Voor Technologisch Onderzoek N.V. (VITO), Mol (BE)

( * ) Notice: Subject to any disclaimer, the term of this patent is extended or adjusted under 35 U.S.C. 154(b) by 483 days.

(21) Appl. No.: 12/675,056

(22) PCT Filed: Aug. 25, 2008

(86) PCT No.: PCT/EP2008/061095
§ 371 (c)(1),
(2), (4) Date: Dec. 8, 2010

(87) PCT Pub. No.: WO2009/027376
PCT Pub. Date: Mar. 5, 2009

(65) Prior Publication Data
US 2011/0089110 A1 Apr. 21, 2011

(30) Foreign Application Priority Data

Aug. 24, 2007 (EP) .................................. 07114971

(51) Int. Cl.
*B01D 53/22* (2006.01)
(52) U.S. Cl.
USPC ................ 95/45; 95/48; 95/50; 95/51; 95/52; 95/54; 95/55; 210/502.1; 210/500.1; 210/500.36
(58) Field of Classification Search
None
See application file for complete search history.

(56) References Cited

U.S. PATENT DOCUMENTS

| 6,316,684 B1* | 11/2001 | Pinnau et al. .................. 585/818 |
| 2003/0220188 A1 | 11/2003 | Marand et al. |
| 2007/0148552 A1* | 6/2007 | Ikemoto et al. ............... 429/254 |

FOREIGN PATENT DOCUMENTS

| EP | 07114971.0 | * | 8/2007 |
| JP | 2001-167796 | | 6/2001 |
| WO | WO 2005061599 A1 | * | 7/2005 |

OTHER PUBLICATIONS

Merkel et al, "Sorption, Transport, and Structural Evidence for Enhanced Free Volume in Poly(4-methyl-2-pentyne)/Fumed Silica Nanocomposite Membranes", Chem. Mater. 2003, 15, 109-123.*
Pinnau and Toy, "Gas and vapor transport properties of amorphous perfluorinated copolymer membranes based on 2,2-bistrifluoromethyl-4,5-difluoro-1,3-dioxole/tetrafluoroethylene", Journal of Membrane Science, 109, (1996), 125-133.*

(Continued)

*Primary Examiner* — Bobby Ramdhanie
*Assistant Examiner* — Benjamin J Behrendt
(74) *Attorney, Agent, or Firm* — Merchant & Gould P.C.

(57) ABSTRACT

A method of manufacturing a filled polymeric membrane includes a first step of preparing a filler suspension having a solvent for a glassy polymer and nanometer-sized particles. The nanometer-sized particles in the filler suspension are aggregated in aggregates having an average aggregate size in the range between 50 nm and smaller than 200 nm. In a following step, the glassy polymer is added to the filler suspension to obtain a polymer suspension. Next, the glassy polymer is dissolved in the polymer suspension. In a next step, the polymer suspension is cast on a substrate, followed by a step of removing the solvent. A filled polymeric membrane includes aggregates of nanometer-sized filler particles. The membrane is used in pervaporation and nanofiltration.

20 Claims, 4 Drawing Sheets

(56) References Cited

OTHER PUBLICATIONS

De Sitter, Kristien, et al. "Silica filled poly (4-methyl-2-pentyne) nanocomposite membranes: Similarities and differences with poly (1-trimethylsilyl-1-propyne)-silica systems." Journal of Membrane Science 321.2 (2008): 284-292.*

Mullens et al., "Characterization of structure and morphology," *Cellular Ceramics* (2005) *Wiley-VCH Verlag*: 227-263.

De Sitter et al., "Silica filled poly (1-trimethylsilyl-1-propyne) nanocomposite membranes: Relation between the transport of gases and structural characteristics," *Journal of Membrane Science* (2006) 278: 83-91.

* cited by examiner

FILLED POLYMERIC MEMBRANES, USE AND METHOD OF MANUFACTURING

This application is a National Stage Application of PCT/EP2008/061095, filed Aug. 25, 2008, which claims benefit of Ser. No. 07114971.0, filed Aug. 24, 2007 in the EPO and which applications are incorporated herein by reference. To the extent appropriate, a claim of priority is made to each of the above disclosed applications.

FIELD OF THE INVENTION

The present invention is related to polymeric membranes comprising fillers, to methods of manufacturing them and to uses thereof. The fillers are nanometre-sized particles. The membrane polymers are glassy polymers having a glass transition temperature higher than or equal to 100° C. Filled polymeric membranes find application in processes for separating a mixture of (fluid) components. Examples of the latter are gas and vapour separation.

STATE OF THE ART

De Sitter et al. in "Silica filled poly(1-trimethylsilyl-1-propyne) nanocomposite membranes: relation between the transport of gases and structural characteristics", Journal of Membrane Science vol. 278 (2006), pp. 83-91, disclose a method for preparing a filled polymeric membrane. The polymer is poly(1-trimethylsilyl-1-propyne), also known as PTMSP and nanoparticles of silica are used as the filler material. The method of manufacturing the membrane is a three-step solvent casting procedure. First, silica is dispersed in toluene by 30 minutes ultrasonic and 3 hours magnetic stirring. Secondly, the PTMSP is dissolved in the silica/toluene dispersion and finally, the solution is cast on a glass plate and dried.

By that method, membranes were obtained comprising aggregates of silica particles in the polymer matrix. It was observed that the silica aggregates in the polymer matrix comprised interstitial nanometre-sized cavities, the average size of which was found to increase with increasing filler content.

De Sitter at al. tested the obtained membranes in gas separation and observed that for a number of gasses, the obtained filled membranes showed an increased permeability compared to pure (non-filled) PTMSP membranes, the permeability increasing with increasing filler content. The increased permeability is thought to be caused by the interstitial cavities in the filler aggregates, which add to the polymer free volume. The polymer free volume is the free volume present in between the polymer chains. It is known that the polymer matrix of some glassy polymers, and PTMSP in particular, has a high free volume (fractional free volume of at least 0.20).

It is believed that the interstitial cavities offer a faster, however non-selective, route of transportation to the penetrants. This results in a higher permeability of the filled membrane, but also in a decrease in selectivity.

The article of De Sitter et al. suggests that in order to increase the permeability of the above PTMSP/nano-silica filled membrane, the filler content should be increased. As disclosed in that article, a higher filler content increases the average interstitial cavity size.

However, a drawback of an increased filler content and hence an increased interstitial cavity size is a decrease in selectivity.

Moreover, for tailoring the permeability and/or the selectivity of a PTMSP/nano-silica filled membrane, the disclosed method has only one parameter, namely the filler content.

SUMMARY OF THE INVENTION

The present invention aims to provide a method of manufacturing a filled polymeric membrane, which method allows to tailor the membrane based on more than one parameter in order to obtain a membrane with predetermined properties.

It is an aim of the invention to provide a method of manufacturing a filled polymeric membrane which improves on manufacturing methods of the prior art and/or overcomes shortcomings of those methods.

It is also an aim of the invention to provide a method of manufacturing a filled polymeric membrane which allows a better control of the structure and/or the characteristics of the obtained membrane.

The present invention also aims to provide a filled polymeric membrane having at least equal or improved properties compared to filled polymeric membranes of the prior art.

The present invention also aims to provide membrane separation processes having an improved performance over processes of the prior art. Particularly, the present invention aims to provide an improved pervaporation process, in particular for concentrating ethanol out of ethanol/water mixtures. Furthermore, the invention aims to provide an improved nanofiltration process.

Aims of the invention are achieved by providing a method of manufacturing a filled polymeric membrane as set out in the appended claims.

Aims of the invention are achieved by providing a filled polymeric membrane as set out in the appended claims.

Aims of the invention are achieved by providing, as set out in the appended claims, uses or applications of filled polymeric membranes of the invention in methods of pervaporation and/or uses or applications of said filled polymeric membranes in methods of nanofiltration.

Therefore, according to a first aspect of the invention, there is provided a method of manufacturing a filled polymeric membrane. The method comprises a first step of preparing a filler suspension comprising (or consisting of) a solvent for a glassy polymer and nanometre-sized particles. The nanometre-sized particles in said filler suspension are aggregated in aggregates having an average aggregate size in the range between 50 nm and up to but not including 200 nm. The glassy polymer has a glass transition temperature of at least 100° C. In a following step, the glassy polymer is added to the filler suspension to obtain a polymer suspension. Next, the glassy polymer is dissolved in the polymer suspension. In a next step, the polymer suspension is cast on a substrate, followed by a step of removing the solvent.

The step of preparing a filler suspension advantageously comprises a step of mixing said filler suspension so as to obtain the aggregates of nanometre-sized particles as indicated.

Preferably, the step of preparing a filler suspension comprises selecting (predetermining) a mixing method for mixing the filler suspension (so as to obtain the aggregates of nanometre-sized particles as indicated). The mixing method can be magnetic stirring. The mixing method can also be mechanical stirring. The mixing method can be ultrasonic stirring as well. The mixing method can be rolling or shaking. More preferably, the step of preparing a filler suspension comprises mixing the filler suspension by only one mixing method.

Preferably, the step of preparing a filler suspension comprises selecting (predetermining) a mixing time in which applying the mixing method to the filler suspension. More preferably, the step of preparing a filler suspension comprises selecting (predetermining) a mixing intensity for applying to the mixing method.

Preferably, the step of dissolving the glassy polymer comprises a step of mixing the polymer suspension. More preferably, said dissolving step further comprises selecting (predetermining) a mixing method for said mixing step. The mixing methods in the step of preparing the filler suspension and in the step of dissolving the glassy polymer are preferably the same.

Preferably, in the step of preparing a filler suspension, the size distribution of the aggregates of nanometre-sized particles has a standard deviation smaller than 100 nm, more preferably smaller than 50 nm. The standard deviation is calculated based on the size distribution of the aggregates.

Average aggregate sizes and standard deviations are to be calculated based on number (size) distributions of the aggregate size. The size distribution of aggregates of nanometre-sized particles in filler suspensions according to the invention can be measured with dynamic light scattering.

Preferably, in the step of preparing a filler suspension, the suspension comprises between 0.01 wt % and 6 wt % nanometre-sized particles, more preferably between 0.01 wt % and 2.4 wt %.

Preferably, in the step of preparing a filler suspension, the suspension comprises between 0.001 vol % and 3 vol % (volume %) nanometre-sized particles.

Preferably, the nanometre-sized particles are hydrophobic.

Preferably, the nanometre-sized particles are non-porous.

Preferably, in the step of adding the glassy polymer to the filler suspension, an amount of said glassy polymer is added in order to obtain a polymer suspension with a total dry matter content in the range between 0.1 wt % and 10 wt %, more preferably between 0.1 wt % and 6 wt %.

Preferably, the substrate is porous.

According to a second aspect of the invention, there is provided a filled polymeric membrane for separating a mixture of fluids. The membrane comprises: a glassy polymer having a glass transition temperature of at least 100° C. and nanometre-sized filler particles. The filler particles are arranged in aggregates, the aggregates having an average aggregate size of at least 50 nm and smaller than 200 nm.

Filled polymeric membranes according to the invention can be obtained by application of methods of the invention.

Preferably, the size distribution of the aggregates of nanometre-sized particles in the filled polymeric membrane of the invention has a standard deviation smaller than or equal to 150 nm, more preferably smaller than 100 nm, even more preferably smaller than 50 nm. The standard deviation is calculated based on the size distribution of the aggregates.

Average aggregate sizes and standard deviations are to be calculated based on number (size) distributions of the aggregate size. The size distribution of aggregates of nanometre-sized particles in polymeric membranes according to the invention can be measured with image analysis.

Preferably, the filled polymeric membrane of the invention comprises between 0.01 wt % and 90 wt % nanometre-sized filler particles, more preferably between 0.01 wt % and 60 wt %.

Preferably, the filled polymeric membrane of the invention comprises between 0.003 vol % and 75 vol % nanometre-sized filler particles.

According to an advantageous embodiment, there is provided an apparatus for separating a mixture of components by pervaporation comprising the filled polymeric membrane of the invention.

According to an advantageous embodiment, there is provided an apparatus for separating a mixture of components by nanofiltration comprising the filled polymeric membrane of the invention.

According to a third aspect of the invention there is provided a use or application of the abovementioned filled polymeric membrane in a process of separating a mixture of components.

The process of separating a mixture of components is preferably a pervaporation process. More preferably, said mixture of components consists (essentially) of a mixture of water and ethanol. In said process the mixture of components is separated in an ethanol-rich fraction and an ethanol-poor fraction.

The process of separating a mixture of components can be a nanofiltration process.

DETAILED DESCRIPTION OF THE INVENTION

Figure 1:
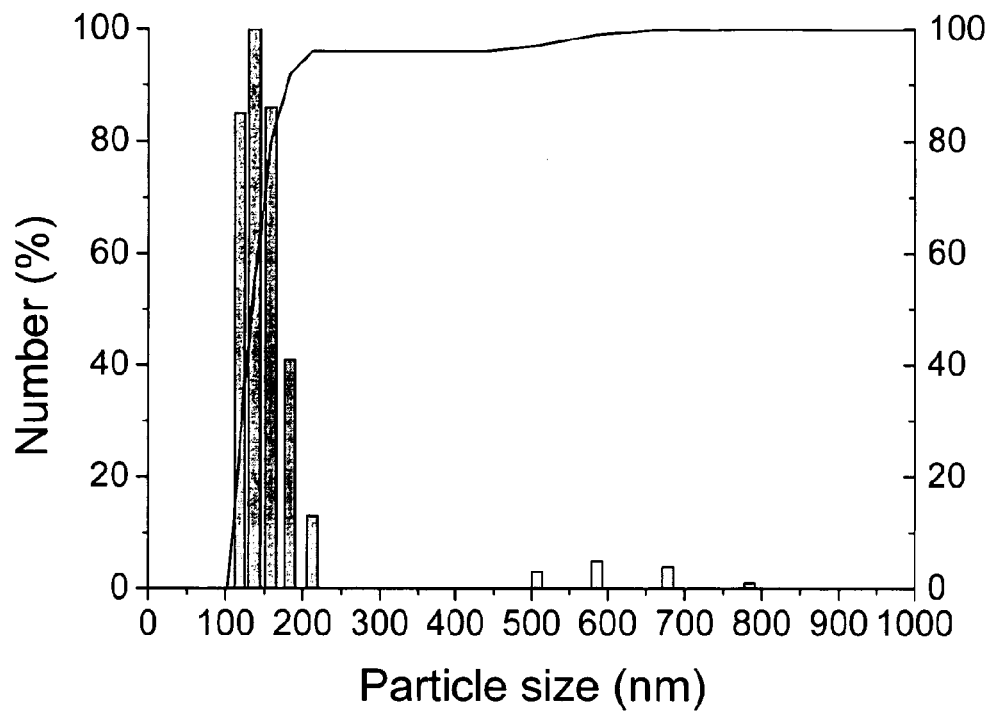
FIG. 1 represents the aggregate size distribution for a suspension of 0.2 g silica nanoparticles in 48 g toluene after 5 minutes magnetic stirring in a KMO 2B magnetic stirrer at 450 rpm (IKA Werke, Germany).

Embodiments of the present invention will now be described in detail with reference to the attached figures, the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention. Those skilled in the art can recognize numerous variations and modifications of this invention that are encompassed by its scope. Accordingly, the description of preferred embodiments should not be deemed to limit the scope of the present invention.

Furthermore, the terms first, second and the like in the description and in the claims are used for distinguishing between similar elements and not necessarily for describing a sequential or chronological order. It is to be understood that the terms so used are interchangeable under appropriate circumstances and that embodiments of the invention described herein are capable of operation in other sequences than described or illustrated herein.

Moreover, the terms top, bottom, left, right, over, under and the like in the description and the claims are used for descriptive purposes and not necessarily for describing relative positions. The terms so used are interchangeable under appropriate circumstances and embodiments of the invention described herein can operate in other orientations than described or illustrated herein. For example, "left" and "right" of an element indicates being located at opposite sides of this element.

It is to be noticed that the term "comprising" should not be interpreted as being restricted to the means listed thereafter; it does not exclude other elements or steps. Thus, the scope of the expression "a device comprising means A and B" should not be limited to devices consisting only of components A and B. It means that with respect to the present invention, A and B are relevant components of the device.

Where numerical values are given with regard to limitations of a quantity, or the outcome of a measurement, for the assessment of those values, account shall be taken of variations due to impurities, methods used to determine measurements, human error, statistical variance, etc.

Where a range of numerical values is defined as extending between a lower limit and an upper limit, the range is to be construed as including said lower limit and said upper limit, unless otherwise noted.

The inventors have found a way of improving the performance of filled polymeric membranes, enabling to reconcile high permeabilities and high selectivities. The inventors found that, besides the filler content, also the aggregate size may play an important role in the performance of filled polymeric membranes. Indeed, a controlled size of the filler aggregates in the membrane, as identified in the present invention can allow to prevent a deterioration of the selectivity, and can possibly even increase it.

The inventors have also found methods of manufacturing filled polymeric membranes, which methods allow to obtain membranes with controlled filler aggregate size as indicated.

The inventors have found a way of tailoring the size of aggregates of nanoparticle fillers during the manufacturing of a filled polymeric membrane. This can allow for tailoring the average interstitial cavity size not only based on the nanoparticle filler content, but also based on the size of the nanoparticle filler aggregates.

The size of the nanoparticle (filler) aggregates can be an additional parameter for tailoring the membrane in order to achieve predetermined properties. For a given filler content, varying the filler aggregate size leads to differences in average interstitial cavity sizes. Moreover, as the interstitial cavities are believed to be responsible for the fast transportation of penetrants, the filler aggregates in the membrane matrix are tailored, such that their size fall in a predetermined range. The predetermined range can improve the accuracy and constancy of some of the membranes' characteristics. The performance of the membrane can be controlled.

The term "nanoparticle" refers to a nanometre-sized particle. Nanoparticles can have a size smaller than 50 nm and preferably smaller than 25 nm. Nanoparticles preferably have a size larger than or equal to 1 nm.

The term "filler" refers to a material in the form of nanoparticles which is suitable for use as filler material in a glassy polymeric membrane. Suitable filler materials can be silica and metal oxides, such as $TiO_2$. The nanoparticles of the filler material are preferably non-porous. The nanoparticles preferably have a high specific surface area. The nanoparticles can be treated or coated, e.g. to make them hydrophobic.

Glassy polymeric membranes comprise a glassy polymer as membrane material. A glassy polymer refers to a polymer having a glass transition temperature above the temperature at which the polymer will be used. The glassy polymers used for the present invention have a glass transition temperature of at least 100° C. The glassy polymers preferably have a high free volume, meaning a fractional free volume of at least 0.20. Possible glassy polymers envisaged by the invention are: substituted polyacetylene polymers, such as PTMSP and PMP: poly(4-methyl-2-pentyne) and amorphous perfluoropolymers, such as Teflon® (copolymer of tetrafluoroethylene and 2,2-bis(trifluoromethyl)-4,5-difluoro-1,3-dioxole) and Hyflon® (copolymer of tetrafluoroethylene and 2,2,4-trifluoro-5-trifluoromethoxy-1,3-dioxole).

Figure 6:
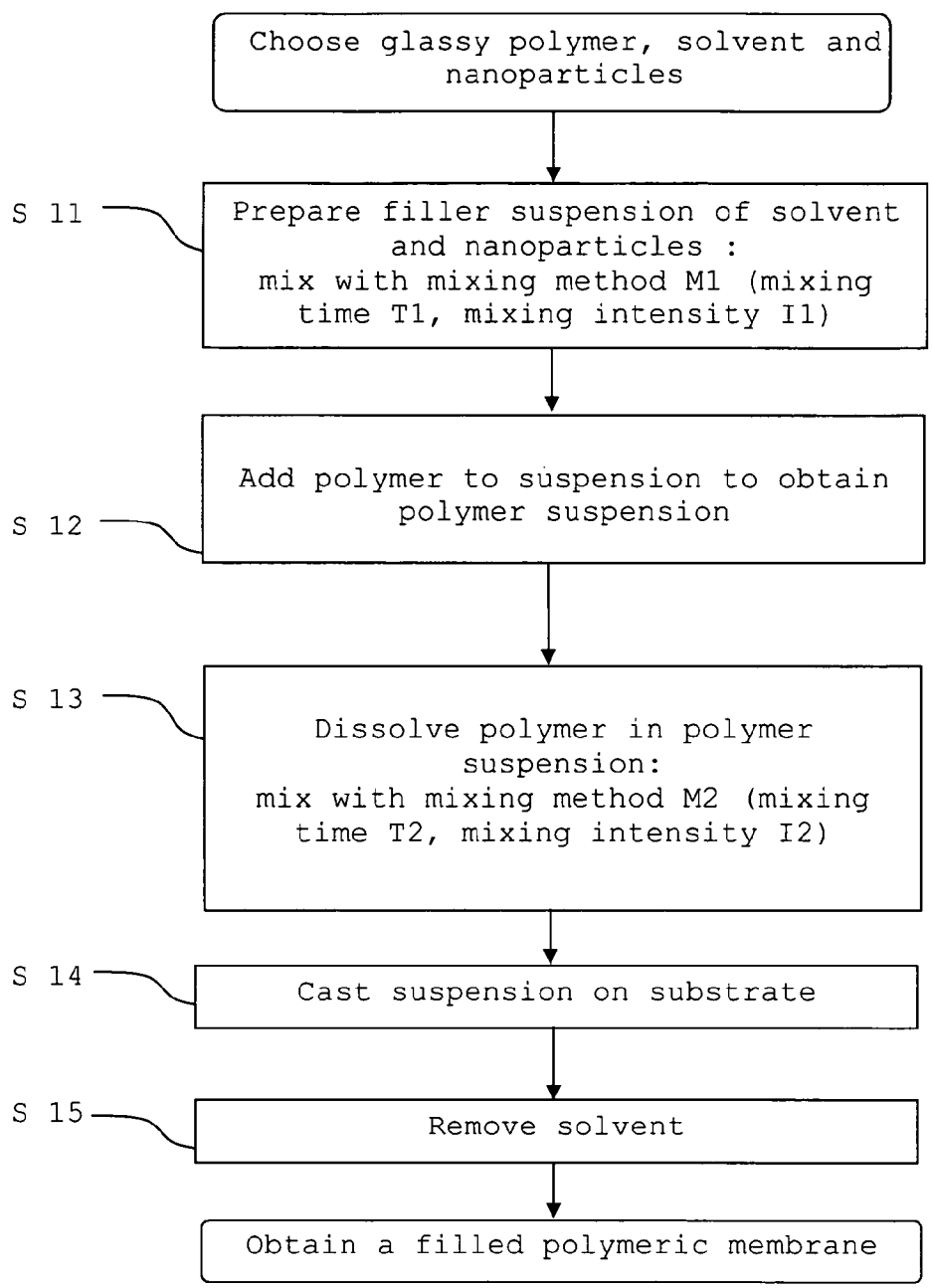
FIG. 6 represents a flow chart of an embodiment of the method of the invention of manufacturing a filled polymeric membrane.

The present invention presents a method of manufacturing a glassy polymeric membrane comprising nanoparticle fillers. According to an advantageous embodiment, the method of the invention comprises a first step S11, as illustrated in the flow chart of FIG. 6, in which a suspension (filler suspension) is prepared of a solvent and a nanoparticle filler material.

The solvent is a solvent for the glassy polymer of which the membrane is made. Toluene, cyclohexane, benzene, chloroform and tetrahydrofuran can be used as a solvent for dissolving PTMSP. Cyclohexane and carbon tetrachloride are preferably used as a solvent for dissolving PMP.

The filler suspension preferably comprises between 0.01 and 6 weight % (wt %) nanoparticle fillers, more preferably between 0.01 and 2.4 wt %.

The filler suspension can comprise between 0.001 and 3 volume % (vol %) nanoparticle fillers.

The inventors have found that the nanoparticle fillers can be aggregated in aggregates of a predetermined average size during the step of preparing a suspension of a solvent and the filler (nanoparticles). A suspension in which the nanoparticles form aggregates having a predetermined average aggregate size can be prepared by mixing the filler suspension with an appropriate mixing method. The mixing method can be applied to the suspension during a predetermined mixing time and preferably at a predetermined intensity.

According to the embodiment, in the first step S11, preparing the filler suspension comprises mixing the filler suspension with a mixing method during a mixing time. A predetermined average nanoparticle filler aggregate size can be obtained by applying a mixing method during a predetermined mixing time. The selection of a mixing intensity can additionally determine the aggregate size. In a preferred embodiment, a mixing time and preferably a mixing intensity are predetermined (selected) for the mixing method. Additional factors that influence the average aggregate size can be: the quantity to be prepared, the kind and size of nanoparticle fillers, the kind of glassy polymer and the kind of solvent. The mixing time and intensity can additionally depend on the mixing method.

Hence, methods according to the invention preferably comprise a step of selecting a mixing method for mixing the filler suspension so as to obtain aggregate sizes as identified. More preferably, based on the mixing method, a mixing time and possibly a mixing intensity is selected.

Magnetic stirring, mechanical stirring, ultrasonic stirring, rolling and shaking are preferred mixing methods, but the invention is not limited to these mixing methods. Magnetic stirring, mechanical stirring, rolling and shaking are more preferred mixing methods. Preferably, only one mixing method is used in the step S11 of preparing a filler suspension.

The preferred average nanoparticle filler aggregate size in the filler suspension falls in the range between 50 nm and 250 nm, more preferably in the range between 50 nm and up to but not including 200 nm.

The filler aggregate size distribution preferably has a standard deviation smaller than or equal to 100 nm, more preferably smaller than or equal to 50 nm. This means that the filler aggregate size is preferably distributed with standard deviations as indicated.

Indicated filler aggregate sizes and distributions (based on average and standard deviation) have found to be optimal in producing filled polymeric membranes. Smaller aggregates tend to combine into larger clusters at the time of casting and solvent evaporation and lead to an uncontrolled aggregate size and possibly to combined aggregates that are too large. Larger aggregates can feature larger deviations from the average, leading to varying product (membrane) characteristics. Larger aggregates offer increased non-selective permeation routes.

When aggregates in the filler suspension occur with sizes (or in a distribution) as indicated, according to the invention the aggregates in the eventual filled polymeric membranes can occur with optimal aggregate size distributions. Aggregate size distributions in the filler suspension are preferably those falling in the range as indicated in table 1, more preferably those falling in the range as indicated in table 2. As can be deduced from tables 1 and 2, preferably, the amount of filler aggregates in the suspension, having a size smaller than 200 nm falls in the range between 51% and 90%.

TABLE 1

Preferred size distribution of the filler aggregates in a filler suspension.

| Aggregate size (nm) | Size occurrence (%) |
|---|---|
| <100 | 0-100 |
| 100-200 | 0-80 |
| >200 | 0-49 |

TABLE 2

Preferred size distribution of the filler aggregates in a filler suspension.

| Aggregate size (nm) | Size occurrence (%) |
|---|---|
| <100 | 0-15 |
| 100-200 | 20-80 |
| 200-300 | 10-25 |
| >300 | 0-24 |

Figure 2:
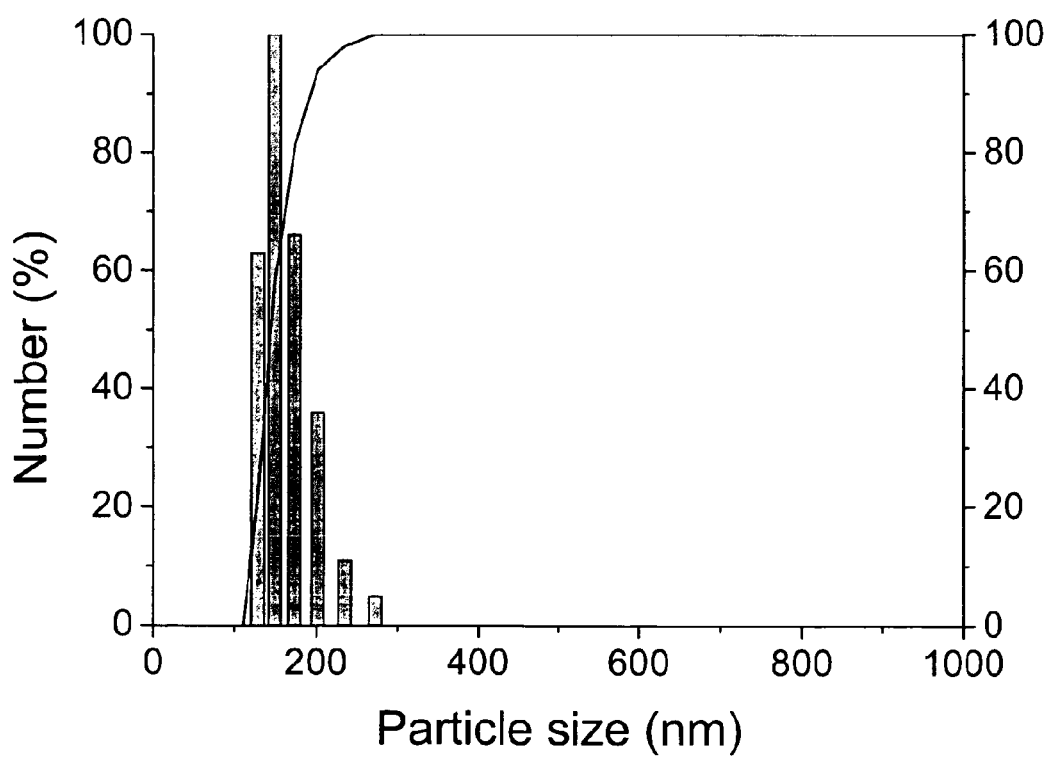
FIG. 2 represents the aggregate size distribution for a suspension of 0.2 g silica nanoparticles in 48 g toluene after 20 minutes magnetic stirring (at 450 rpm) in the stirrer of FIG. 1.
Figure 3:
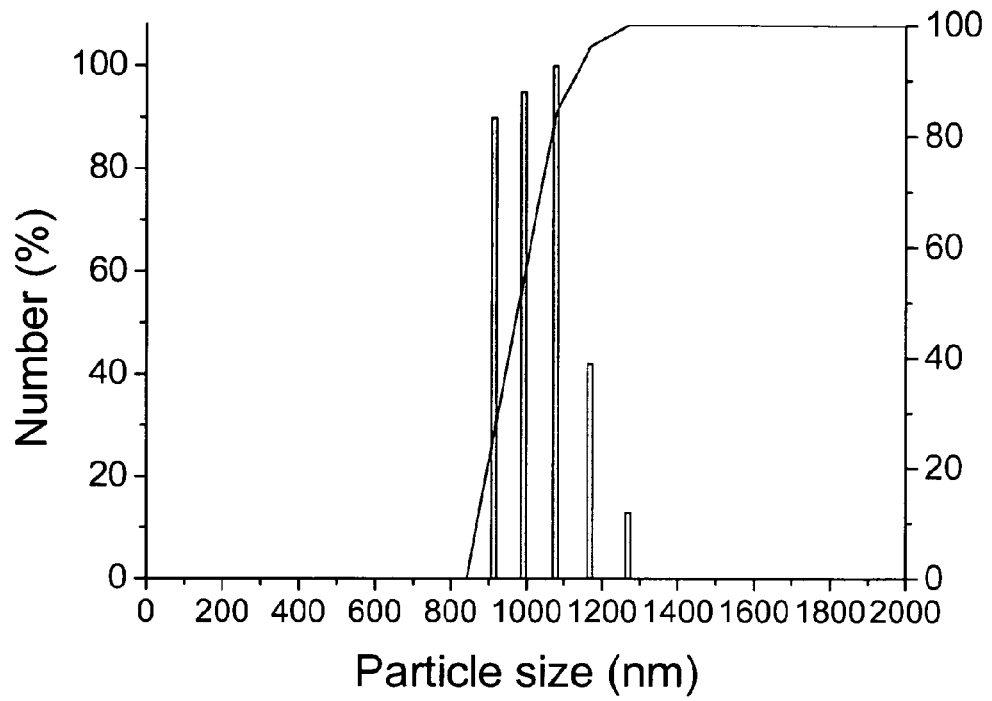
FIG. 3 represents the aggregate size distribution for a suspension of 0.2 g silica nanoparticles in 48 g toluene after 60 minutes magnetic stirring (at 450 rpm) in the stirrer of FIG. 1.

By way of example, FIGS. 1 to 3 plot the aggregate size distribution of nanoparticle-silica (Cabosil TS-530, Cabot Corp. Germany) in a toluene suspension. The diameter of the silica nanoparticles was measured based on the specific surface area and was found to be about 13 nm. The aggregate size in the suspension was measured with dynamic light scattering by a ZetaPlus Particle Sizing apparatus (Brookhaven Instruments Corp.).

TS-530 is a fumed silica that has been made hydrophobic by a treatment with hexamethyldisilazane. The reported density is 2.2 g/cm$^3$, the specific surface area 220 m$^2$/g.

The suspension was prepared by adding 0.2 g silica nanoparticles to 48 g of toluene. Five minutes of magnetic stirring with a KMO 2B magnetic stirrer (IKA Werke, Germany) at an intensity of 450 rpm lead to the aggregate size as shown in FIG. 1. Twenty minutes magnetic stirring (with same device at the same intensity) lead to a different aggregate size as shown in FIG. 2 and 60 minutes magnetic stirring lead to the aggregate size as in FIG. 3. FIGS. 1 to 3 show the distribution of the aggregate size, normalized with reference to the interval with highest occurrence (left scale, bar with highest occurrence is taken as reference of 100%). The scale on the right refers to the curve indicating cumulative values.

FIG. 1 shows that after 5 minutes magnetic stirring, the majority of the aggregates had a size between 100 nm and 250 nm, while there were a smaller number of aggregates having a larger size (larger than 300 nm, between 500-800 nm). After 20 minutes magnetic stirring, as illustrated by FIG. 2, all aggregates had sizes ranging between 100 and 300 nm (average aggregate size of 160 nm). FIG. 3 illustrates the effect of long stirring times on the aggregate size. The aggregates increased in size, having a range now between 900 and 1300 nm.

Clearly, FIG. 2 indicates a preferred distribution for the aggregate size. Hence, magnetic stirring for 20 minutes would be satisfactory for the given suspension. Magnetic stirring for 60 minutes leads to filler aggregate sizes which are too large. For the given suspension, magnetic stirring should be applied for less than 60 minutes.

Figure 4:
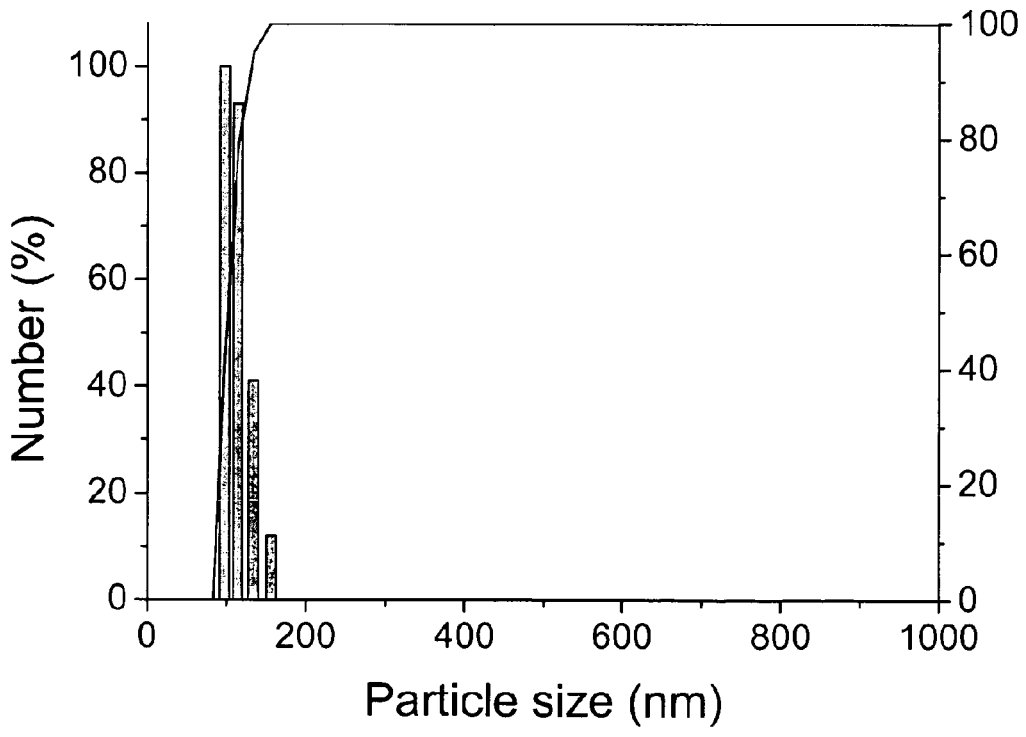
FIG. 4 represents the aggregate size distribution for a suspension of 1 g silica nanoparticles in 48 g toluene after 5 minutes magnetic stirring (at 450 rpm) in the stirrer of FIG. 1.
Figure 5:
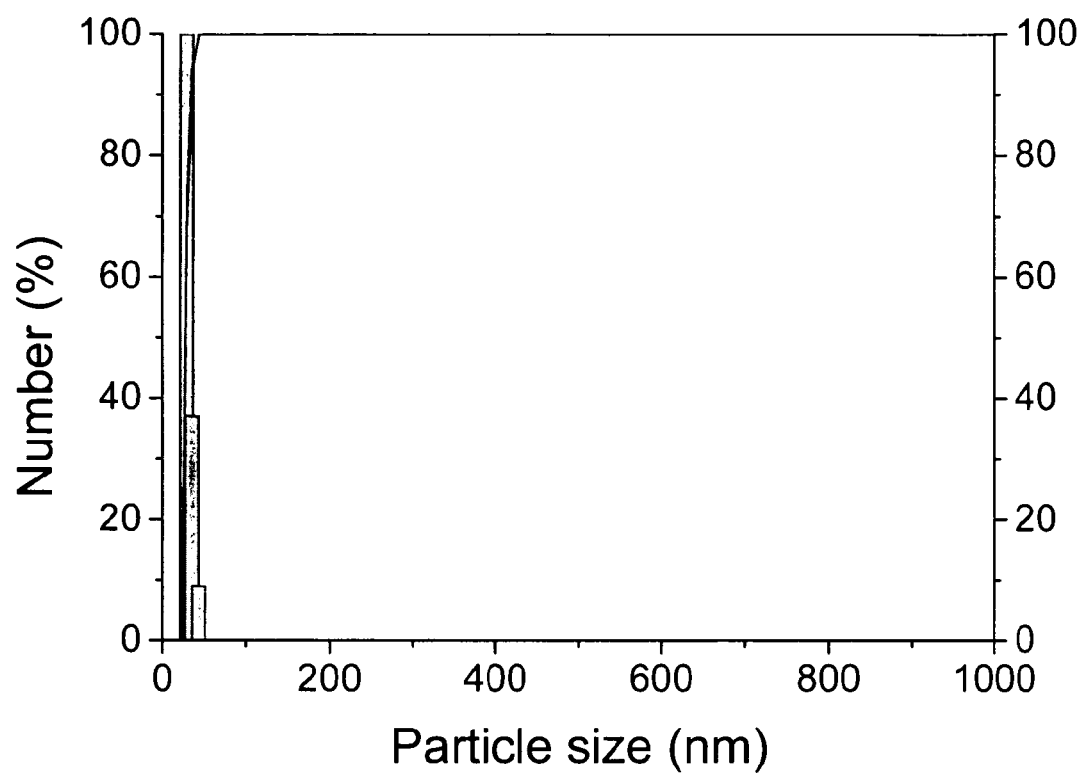
FIG. 5 represents the aggregate size distribution for a suspension of 1 g silica nanoparticles in 48 g toluene after 3 minutes ultrasonic stirring with a Vibracell CV 26 ultrasonic stirrer (Sonics & Materials, USA).

FIGS. 4 and 5 plot the aggregate size distribution of suspensions of 1 g silica nanoparticles in 48 g toluene. The distribution of FIG. 4 is obtained after 5 minutes magnetic stirring. The distribution of FIG. 5 is obtained after 3 minutes ultrasonic stirring.

In a following step S12, the membrane polymer is added to the filler suspension comprising the solvent and the aggregates of nanoparticles to form a polymer suspension. The membrane polymer is a glassy polymer, such as PTMSP or PMP. The amount of polymer added to the filler suspension can be such that the total dry matter of the polymer suspension falls in the range between 0.1 and 10 weight %, preferably between 0.1 wt % and 6 wt %. The total dry matter refers to the mass of the polymer and of the nanoparticle filler material in the polymer suspension.

In a next step S13, the glassy polymer is dissolved in the polymer suspension. This can be done by mixing the suspension in order to dissolve the polymer. As the suspension now has a higher viscosity, the mixing method in the present step is less critical for tailoring the size of the nanoparticle aggregates.

However, it is preferable to mix the suspension also in this step with an appropriate, predetermined mixing method. The mixing method and the mixing time and preferably also the mixing intensity can be determined (selected) based on the same criteria as in the first step. The mixing method M2 of step S13 is preferably the same as mixing method M1 of the first step S11. The mixing intensity I2 applied in step S13 is preferably not higher than the mixing intensity I1 applied in step S11. The mixing time T2 is typically longer than mixing time T1 due to the long times needed for dissolving the polymer.

The suspension with dissolved polymer is cast on a substrate in a next step S14. The substrate can be porous or non-porous. Non-porous substrates, such as glass and polyacrylonitrile, are merely used to cast the membrane in a defined shape. Porous substrates can be membrane supports and can be used for reinforcing the membrane.

In a final step S15, the solvent is removed from the suspension, so as to obtain a membrane. Solvent removal can be performed by evaporation. After removal of the solvent, the membrane can be removed from the substrate (in case the substrate is not a reinforcing support). Otherwise, a membrane with reinforcing support is obtained. Additional treatments can be performed on the membrane, as are known in the art.

The invention is also related to nanoparticle-filled polymeric membranes comprising aggregates of nanoparticles.

Such membranes can be obtained by methods of manufacturing of the invention. The polymer is a glassy polymer having a glass transition temperature of at least 100° C. The nanoparticles in the membrane are arranged in aggregates having an average aggregate size of at least 50 nm and smaller than 200 nm.

The size distribution of the aggregates of filler particles in the filled polymeric membranes of the invention can have a standard deviation smaller than or equal to 150 nm, preferably smaller than 100 nm and more preferably smaller than 50 nm. This means that the aggregate size is preferably so distributed to have standard deviations as indicated. Average aggregate sizes and standard deviations are based on number distribution.

Aggregate size distributions in filled membranes according to the invention are preferably those falling in the range as indicated in table 3, more preferably those falling in the range as indicated in table 4. As can be deduced from tables 3 and 4, preferably, the amount of filler aggregates in the filled membranes, having a size smaller than 200 nm falls in the range between 51% and 90%.

A well-defined aggregate size distribution leads to a product with uniform and repeatable performance capabilities.

Indeed, aggregates that are too large in size, can form interstitial cavities that are too large or too high in amount, which negatively affects the selectivity of a membrane. Therefore, in most cases the aggregate size is preferably selected such that an optimal balance is obtained between permeability and selectivity of the membrane.

TABLE 3

Preferred size distribution of the filler aggregates in a filled polymeric membrane.

| Aggregate size (nm) | Size occurrence (%) |
|---|---|
| <100 | 10-40 |
| 100-200 | 20-75 |
| >200 | 0-49 |

TABLE 4

Preferred size distribution of the filler aggregates in a filled polymeric membrane.

| Aggregate size (nm) | Size occurrence (%) |
|---|---|
| <100 | 10-40 |
| 100-200 | 20-75 |
| 200-300 | 10-25 |
| >300 | 0-24 |

Aggregate sizes in filled polymeric membranes according to the invention can be measured with image analysis. A possible procedure that can be followed is described by Mullens et al. in Cellular Ceramics, chapter "Characterization of structure and morphology" pp. 227-263, Wiley-VCH Verlag, 2005, edited by M. Scheffler and P. Colombo. Aggregate sizes as indicated refer to an equivalent circle diameter.

The membranes of the invention preferably comprise between 0.01 wt % and 90 wt % nanoparticles, more preferably between 0.01 wt % and 60 wt % nanoparticles, even more preferably between 0.01 wt % and 40 wt % and particularly preferably between 0.01 wt % and 30 wt %. The membranes of the invention can comprise between 70 wt % and 90 wt % of nanoparticles.

The membranes of the invention preferably comprise between 0.003 vol % and 75 vol % nanoparticles.

The filled polymeric membranes of the invention can find application in apparatuses for separating a mixture of components by pervaporation. They can find application in nanofiltration apparatuses as well.

Nanoparticle-filled glassy polymeric membranes can advantageously be used in processes for separating a mixture of (fluid) components. Examples of the latter are gas and vapour separation. In addition, the inventors found that such membranes can advantageously be used in pervaporation processes. The membranes can also be used in nanofiltration processes.

Pervaporation is a fractionation process, in which a liquid mixture is maintained at atmospheric pressure on the feed side of the membrane and the permeate is removed as a vapour. Transport through the membrane is induced by the vapour pressure difference between the feed and the permeate vapour. The pressure difference can be achieved by using a vacuum pump at the permeate side, or by cooling the permeate vapour to create a partial vacuum.

While the properties of a gas separation membrane for a given gas mixture can be predicted by measuring the pure gas properties, this is not the case for pervaporation, because the separation of a liquid mixture is influenced by the interaction of each feed component with the polymer and possibly the filler material and the interaction between the different feed components. Furthermore, the affinity of liquids for polymers is much larger than the affinity of gasses for the same polymers, which leads to higher sorption coefficients. The separation capacity of a pervaporation membrane is primarily a function of the membrane material and the feed species. Secondary influences are feed temperature, feed composition and permeate pressure. Hence, finding a performing membrane for concentrating a given liquid mixture by pervaporation is not a straightforward task.

Pervaporation is used on an industrial scale to separate ethanol from its dilute aqueous solutions. One of the applications wherein ethanol/water separation is the key factor is the production of bio-ethanol. Bio-ethanol can be produced from the fermentation of sugar by enzymes produced from specific varieties of yeast. Unfortunately, the fermentation product comprises large quantities of water, hence requiring bio-ethanol to be extracted from an ethanol/water mixture. This can be performed by conventional techniques, such as distillation and solvent extraction, but these processes are very energy consuming. Pervaporation with ethanol-selective membranes allows to concentrate low-concentration bio-ethanol from fermentation broths in an economically effective way.

It is known to use polydimethylsiloxane (PDMS) membranes for the ethanol recovery from fermentation broths.

The nanoparticle-filled glassy polymeric membranes of the invention can be used instead of PDMS for the ethanol concentration of ethanol/water mixtures by pervaporation.

Table 5 compares the performance of prior art membranes and of membranes obtained by the invention in pervaporation of ethanol/water mixtures. The latter membranes offer a higher selectivity and high permeabilities compared with the membranes used in the art for ethanol/water pervaporation.

TABLE 5

Comparison of filled PDMS and PTMSP (with 50 wt % filler content) membranes for pervaporation. The feed consisted of ethanol and water. The separation factor is the ratio of the permeate-to-feed weight fraction of ethanol to the permeate-to-feed weight fraction of water. The filled PDMS membrane is a PERVAP 1070 from Sulzer, Switzerland (hydrophobic zeolite silicalite-1 filled membrane).

| Membrane | Membrane thickness (μm) | wt % ethanol in feed | Flux (kg/m²h) | Separation factor |
|---|---|---|---|---|
| filled PDMS | 30 | 10 | 0.6 | 10.2 |
| 50 wt %-filled PTMSP | 125 | 10 | 0.40 | 15.3 |
| 50 wt %-filled PTMSP | 30 | 5 | 1.25 | 12.7 |

EXAMPLE 1

1.002 g of silica nanoparticles (TS-530) were added tot 50 g toluene and magnetically stirred during 5 minutes. The aggregates of the silica nanoparticles in the suspension had an average aggregate size of 110 nm. Thereafter, 1 g PTMSP was added and the suspension was magnetically stirred during 4 days, until the polymer was completely dissolved in the suspension. Next, the suspension was cast on a glass plate and the solvent was allowed to evaporate under ambient conditions, leaving a filled polymer film (i.e. the membrane) of 125 μm thickness. After evaporation, the polymer film was removed from the glass plate by immersion in demi-water. The nanoparticle fillers constituted 50 wt % of the membrane.

The membrane was heated for 2 hours at 80° C. and tested for the pervaporation of ethanol/water mixtures. A feed of 10 wt % ethanol in water mixture was circulated at one side of the membrane and a vacuum of 0.2 mbar was maintained on the other side of the membrane. A permeate of 63 wt % ethanol/water mixture was collected at said other side. The flux through the membrane was 0.4 kg/m².h.

EXAMPLE 2

The PTMSP/silica/toluene suspension of example 1 was diluted to a dry matter content of 3 wt % and cast on a porous polyacrylonitrile (PAN) layer with a casting thickness of 1 mm. After evaporation of the solvent, a filled polymer film (i.e. the membrane) of 30 μm was formed on top of the porous PAN layer. The weight fraction of the nanoparticle fillers in the membrane was 50 wt %.

The obtained membrane was heated for 2 hours at 80° C. in order to completely remove the solvent and tested for the pervaporation of ethanol/water mixtures. A 5 wt % ethanol in water mixture was circulated at one side of the membrane and a vacuum of 0.2 mbar was maintained on the other side of the membrane. A permeate of 40 wt % ethanol/water mixture was collected on said other side. The flux through the membrane was 1.25 kg/m².h.

The invention claimed is:

1. A filled polymeric membrane for separating a mixture of fluids, the membrane comprising:
a glassy polymer having a glass transition temperature of at least 100° C.; and
nanometer-sized filler particles, wherein said filler particles are arranged in aggregates, the aggregates having an average aggregate size of at least 50 nm and smaller than 200 nm, wherein the size distribution of said aggregates has a standard deviation smaller than or equal to 150 nm.

2. The filled polymeric membrane according to claim 1, comprising a porous support.

3. The filled polymeric membrane according to claim 1, wherein the nanometer-sized particles have a size between 1 nm and 25 nm.

4. The filled polymeric membrane according to claim 1, wherein the nanometer-sized particles comprise hyrdrophobic silica.

5. The filled polymeric membrane according to claim 1, wherein the glassy polymer is a substituted polyacetylene polymer or an amorphous perfluouropolymer.

6. The filled polymeric membrane according to claim 5, wherein the glassy polymer is a copolymer of tetrafluoroethylene and 2,2-bis(trifluoromethyl)-4,5-difluoro-1,3-dioxle, or a copolymer of tetrafluoroethylene and 2,2,4-trifluoro-5-trifluoromethoxy-1,3 dioxole.

7. The filled polymeric membrane according to claim 1, wherein the glassy polymer is poly(1-trimethylsilyl-1-propyne) or poly(4-methyl-2-pentyne).

8. The filled polymeric membrane according to claim 1, wherein nanometer-sized particles form between 0.01% and 90% by weight of the membrane.

9. A filled polymeric membrane for separating a mixture of fluids, the membrane comprising:
a glassy polymer having a glass transition temperature of at least 100° C.; and nanometer-sized filler particles, wherein said filler particles are arranged in aggregates, the aggregates having an average aggregate size of at least 50 nm and smaller than 200 nm, wherein between 51% and 90% of the aggregates have a size smaller than 200nm.

10. The filled polymeric membrane according to claim 9, comprising a porous support.

11. The filled polymeric membrane according to claim 9, wherein the nanometer-sized particles comprise hyrdrophobic silica.

12. The filled polymeric membrane according to claim 9, wherein the glassy polymer is a substituted polyacetylene polymer or an amorphous perfluouropolymer.

13. The filled polymeric membrane according to claim 12, wherein the glassy polymer is a copolymer of tetrafluoroethylene and 2,2-bis(trifluoromethyl)-4,5-difluoro-1,3-dioxle, or a copolymer of tetrafluoroethylene and 2,2,4-trifluoro-5-trifluoromethoxy-1,3 dioxole.

14. The filled polymeric membrane according to claim 9, wherein the glassy polymer is poly(1-trimethylsilyl-1-propyne) or poly(4-methyl-2-pentyne).

15. A filled polymeric membrane for separating a mixture of fluids, the membrane comprising:
a glassy polymer having a glass transition temperature of at least 100° C.; and nanometer-sized filler particles, wherein said filler particles are arranged in aggregates, the aggregates having an average aggregate size of at least 50 nm and smaller than 200 nm, wherein between 10% and 40% of the aggregates have a size smaller than 100 nm, between 20% and 75% of the aggregates have a size between 100 nm and 200 nm and between 0% and 49% of the aggregates have a size larger than 200nm.

16. The filled polymeric membrane according to claim 15, comprising a porous support.

17. The filled polymeric membrane according to claim 15, wherein the nanometer-sized particles comprise hyrdrophobic silica.

18. The filled polymeric membrane according to claim 15, wherein the glassy polymer is a substituted polyacetylene polymer or an amorphous perfluouropolymer.

19. The filled polymeric membrane according to claim 18, wherein the glassy polymer is a copolymer of tetrafluoroethylene and 2,2-bis(trifluoromethyl)-4,5-difluoro-1,3-dioxle, or a copolymer of tetrafluoroethylene and 2,2,4-trifluoro-5-trifluoromethoxy-1,3 dioxole.

20. The filled polymeric membrane according to claim 15, wherein the glassy polymer is poly(1-trimethylsilyl-1-propyne) or poly(4-methyl-2-pentyne).

* * * * *